Dec. 4, 1923.  
M. P. WILL  
ATTACHMENT FOR MOTOR VEHICLES  
Filed Aug. 4, 1922  
1,476,665
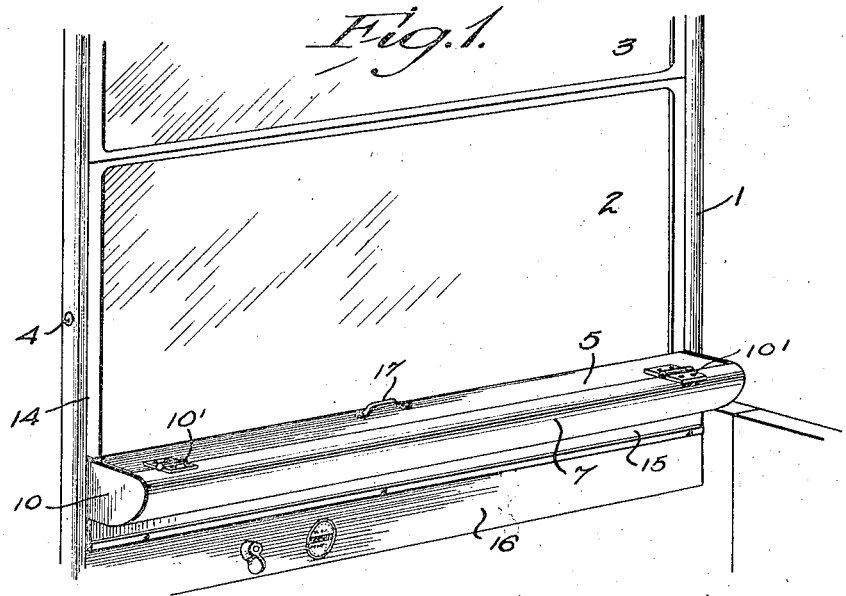
Fig.1.
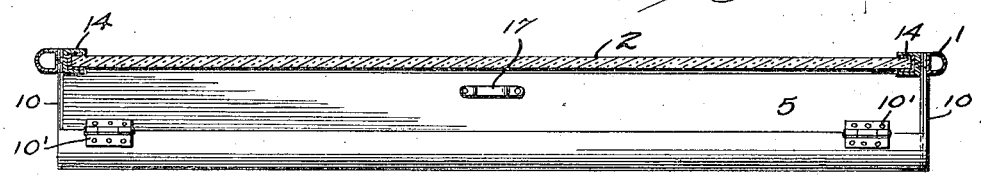
Fig.2.
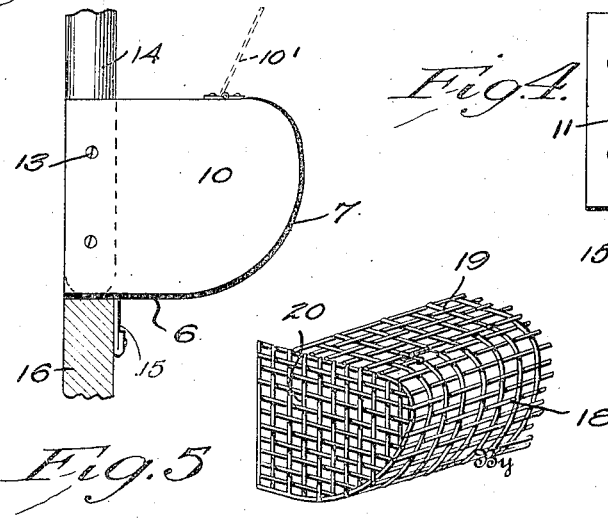
Fig.3.
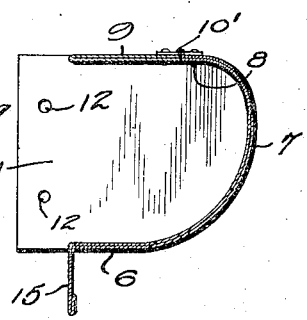
Fig.4.
Fig.5.
Inventor  
M. P. WILL
Attorney Patented Dec. 4, 1923.

1,476,665

UNITED STATES PATENT OFFICE.

MATTHEW PHILLIP WILL, OF RICHMOND, VIRGINIA.

ATTACHMENT FOR MOTOR VEHICLES.

Application filed August 4, 1922. Serial No. 579,688.

*To all whom it may concern:*

Be it known that I, MATTHEW PHILLIP WILL, a citizen of the United States, residing at Richmond, in the county of Henrico and State of Virginia, have invented certain new and useful Improvements in Attachments for Motor Vehicles, of which the following is a specification.

This invention relates to attachments for motor vehicles, and more particularly to a receptacle or container adapted to be secured to the windshield frame in front of the driver's seat for holding road maps, plans, and similar articles.

An object of the invention is the provision of a container or receptacle which may be readily secured to the windshield frame.

A further object is the provision of a device of this character which may be stamped from sheet metal and cheaply manufactured.

A further object is the provision of an attachment for motor vehicles, which may be quickly and easily secured in position.

In the accompanying drawings, I have shown several embodiments of the invention. In this showing:

Figure 1 is a perspective view of a windshield frame looking from the rear, showing the invention in position, Figure 2 is a horizontal sectional view through the windshield on a line above the attachment, Figure 3 is an end view of the attachment in position, Figure 4 is a transverse vertical sectional view thereof, and, Figure 5 is a perspective view of another form of the invention, made of wire mesh.

Referring to the drawings, the reference numeral 1 designates generally, a windshield frame of a motor vehicle adapted to receive a lower windshield section 2 and an upper windshield section 3. The windshield is of the usual construction, and the lower section is pivoted to the frame by means of pins 4, arranged intermediate the top and bottom of the lower section and projecting through the frame.

The attachment forming the subject matter of the present invention consists of a container or receptacle 5. As shown, the receptacle is provided with a bottom portion 6 which curves upwardly, forming a rear wall 7. The upper portion of the rear wall extends over the base in a horizontal plane, as indicated at 8, and a cover 9 is secured thereto by means of hinges 10'. The free end of the cover, when in closed position, is arranged in alinement with the forward end of the bottom wall or base, as shown in Figure 4 of the drawings.

When attached to the vehicle, the receptacle is arranged behind the lower section of the windshield and the windshield thus forms the front wall of the receptacle. It is provided with end walls 10, having forwardly extending portions 11. These portions are provided with openings 12, for the reception of screws or other suitable fastening elements which are received in the windshield frame or in the framing 14 of the windshield section. A downwardly extending flange 15 is arranged on the base and is adapted to contact with the dash 16 of the vehicle, when the windshield is in closed position, to form an additional support therefor. The cover is provided with a handle 17 to permit manipulation thereof.

In the form of the invention shown in Figure 5 of the drawings, the attachment is formed of wire mesh, and consists of a body portion 18, having a hinged cover 19, and end walls 20.

By providing a receptacle attached to the rear side, or the inside of a windshield, the driver of the vehicle may place road maps or other plans to which he frequently desires access while driving, in the receptacle and may refer to them at any time without stopping the vehicle or leaving the driver's seat.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. An attachment for motor vehicles, comprising a receptacle adapted to be secured to the inner side of a windshield, said receptacle comprising a base, rear wall, end walls, and a hinged top, the windshield being adapted to form the front of said receptacle, said end walls being provided with extensions adapted to be secured to the windshield frame to support said receptacle.

2. An attachment for motor vehicles, comprising a receptacle adapted to be secured to the inner side of a windshield, said receptacle comprising a base, rear wall, end walls, and a hinged top, the windshield being adapted to form the front of said receptacle, means for securing said receptacle to the windshield frame, and a downwardly extending flange formed on the base of said receptacle and adapted to engage the body of the vehicle to support said receptacle.

In testimony whereof, I affix my signature in presence of two witnesses.

MATTHEW PHILLIP WILL.

Witnesses:
  K. C. Bass,
  O. M. Stumpf.